July 31, 1923.

M. H. RYAN 1,463,767

AIR BRAKE EMERGENCY CHECK VALVE

Filed Aug. 7, 1922

Inventor
Michael H. Ryan
By Hazard & Miller
Attorneys.

Patented July 31, 1923.

1,463,767

UNITED STATES PATENT OFFICE.

MICHAEL H. RYAN, OF SAN BERNARDINO, CALIFORNIA, ASSIGNOR OF ONE-TENTH TO JULIUS J. PEYRON, OF SAN BERNARDINO, CALIFORNIA.

AIR-BRAKE EMERGENCY CHECK VALVE.

Application filed August 7, 1922. Serial No. 580,240.

*To all whom it may concern:*

Be it known that I, MICHAEL H. RYAN, a citizen of the United States, residing at San Bernardino, in the county of San Bernardino and State of California, have invented new and useful Improvements in Air-Brake Emergency Check Valves, of which the following is a specification.

My invention relates to air brake valves of the check or non-return type as embodied in my Patent No. 1,418,400, issued June 6, 1922.

The purpose of my present invention is the provision of an emergency check valve which operates to prevent an undesired emergency application of a quick action triple valve from carrying or transmitting the undesired emergency to the other cars in an air braked train, thereby eliminating a very undesirable feature of a quick action triple valve in an air brake system which often causes considerable damage to equipment and contents, especially in long freight trains.

It is also a purpose of my invention to provide an emergency check valve which permits a free and unrestricted flow therethrough when the brakes are intentionally applied thereby preventing interference with the quick acting feature of a triple valve.

Although I have herein shown and described only one form of emergency check valve embodying my invention, it is to be understood that various changes and modifications may be made herein without departing from the spirit of the invention and the spirit and scope of the appended claims.

In the accompanying drawings.

Similar reference characters refer to similar parts in each of the several views.

Figure 1:
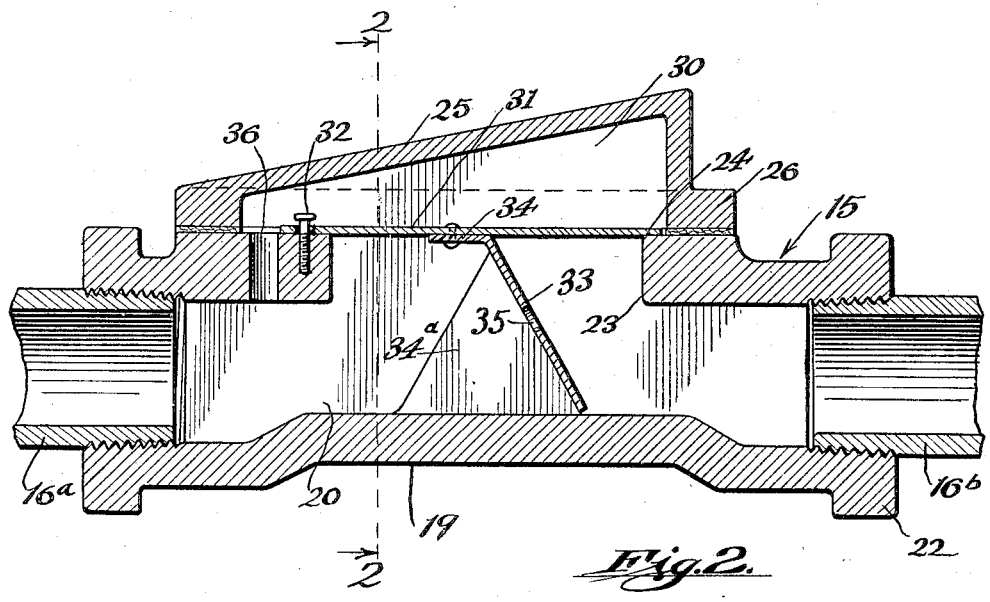
Figure 1 is a view showing in longitudinal section one form of check valve embodying my invention.
Figure 3:
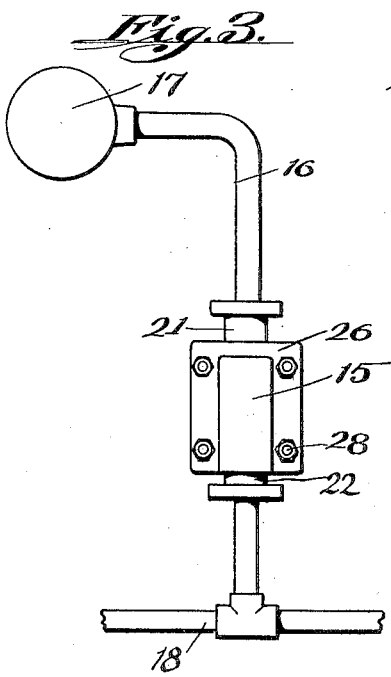
Fig. 3 is a diagrammatic plan showing the valve in relation to sundry standard parts of an air brake equipment.

Referring specifically to the drawings, and particularly to Fig. 1, 15 designates generally the check valve which is shown as interposed in the line of a conduit 16 connected at one end to a triple valve 17 and at the opposite end to a portion 18 of a train line of an air brake system.

Figure 2:
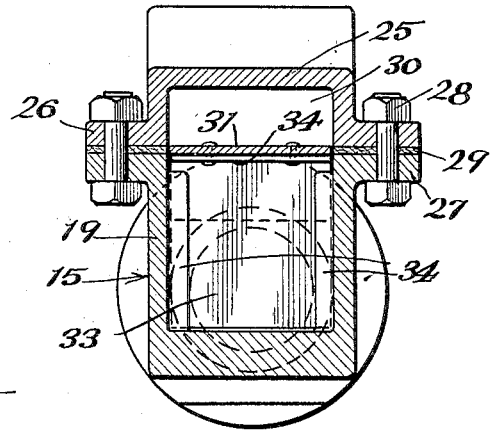
Fig. 2 is a transverse section taken on the line 2—2 of Fig. 1.

As shown in Figs. 1 and 2, the check valve includes a casing 19 constructed to provide a longitudinally extending passageway 20. The passageway connects at its opposite ends with nipples 21 and 22 in which are threaded the sections of the conduit 16. For the purpose of explanation, the sections of the conduit are designated 16ª and 16ᵇ in Fig. 1. The casing 19 is provided with a neck 23, the upper end of which forms a valve seat 24. The casing includes a cap 25 having a flange 26 co-operating with a flange 27 of the casing 19, and through which are extended securing members 28 whereby the cap is secured to the casing. The gasket 29 is preferably interposed between the flanges 26 and 27 for rendering the joint between the two air tight.

The space within the cap 25 constitutes a chamber 30, the lower wall of which is defined by a valve 31 pivoted upon the neck 23 by screws or other supporting elements 32 so as to normally repose upon the seat 24. The valve 31 includes a subsidiary valve 33 which is of substantially triangular formation so as to completely block the passageway 20 when in normal position. This subsidiary valve 33 is provided with a lip 34 which is riveted or otherwise secured to the valve 31 so as to move with the latter. The side portions of the valve 33 are adapted to abut lips or flanges 34ª formed integral with the casing 19 and arranged in opposite sides of the passageway 20, as clearly shown in Fig. 2. These flanges 34ª co-operate with the side portions of the valve 33 in preventing the passage of air through the passageway 20 when the valve is in closed position.

A port 35 is formed in the valve 31 for the purpose of establishing communication between the chamber 30 and the passageway 20. A port 36 is formed in the neck 23 and establishes communication between the chamber 30 and the passageway 20 independently of the valve 31.

In the operation of the valve, any legitimate reduction in pressure in the train pipe 18, for the purpose of applying the brakes, will be communicated to the chamber 30 by way of the port 36 thereby permitting the valve 31 to open under the pressure in the passageway 20 and the conduit section 16ᵇ. With the opening of the valve 31, it will be clear that the valve 33 is also elevated to open position thereby allowing of the unrestricted flow of air from the section 16ᵇ to the section 16ᵃ, as it will be manifest that with the valve 33 elevated, a linear and uninterrupted passageway is presented. By virtue of this passageway, the velocity of the air is in no way retarded, thereby increasing the efficiency of the valve.

The above refers to the operation of the valve when the brakes are applied in desired emergency position. When a triple valve is in undesired emergency position, the valve operates in the following manner:

A sudden reduction is made in train line pressure in conduit section 16ᵇ but, as the passageway 20 is blocked by valve 33 which is then in normal or closed position it thereby prevents any great or sudden reduction in conduit section 16ᵃ or train line 18 through passageway 20, as the only communication that exists between conduits 16ᵇ and 16ᵃ in normal or closed position is through port 35 in valve 33, port 35 being only large enough to allow a service application of air to flow through same, but not large enough to permit a sudden or great reduction of air which would cause other triple valves to apply in emergency position. Valves 31 and 33 are held on their seats by pressure in chamber 30 being greater than pressure in that part of passage 20 next to conduit 16ᵇ.

What is claimed is:

1. In combination, a casing provided with a chamber, and a passageway, and a valve mounted in the casing between the chamber and the passageway, and a second valve carried by the first valve, the first valve being mounted for swinging movement to allow of both valves occupying open or closed positions simultaneously.

2. In combination, a casing having a straight passageway, and a chamber, and valves mounted for simultaneous movement to control communication between the chamber and passageway and the passage of air through the passageway.

3. In combination, a casing having a straight passageway therethrough, and a chamber, flanges formed on the walls of the passageway, a valve for controlling the passage of fluid through the passageway and adapted when in closed position to abut said flanges, and a second valve for controlling the passage of fluid from the passageway to said chamber.

4. In combination, a casing having a straight passageway therethrough, and a chamber, flanges formed on the walls of the passageway, a valve for controlling the passage of fluid through the passageway and adapted when in closed position to abut said flanges, and a second valve for controlling the passage of fluid from the passageway to said chamber, said valves being mounted for simultaneous movement.

5. In combination, a casing having a straight passageway and a chamber formed therein, a valve of substantially triangular form for controlling the passage of fluid through the passageway, and a second valve for controlling the passage of fluid from the passageway to said chamber, the second valve being mounted for swinging movement, and the first valve secured to the second valve.

In testimony whereof I have signed my name to this specification.

MICHAEL H. RYAN.